United States Patent [19]

Ohtorii

[11] Patent Number: 4,690,527
[45] Date of Patent: Sep. 1, 1987

[54] DEVICE FOR REPRODUCTION AND TRACING

[75] Inventor: Masakazu Ohtorii, Hikoneshi, Japan

[73] Assignee: Dainippon Screen Mfg. Co., Ltd., Kyoto, Japan

[21] Appl. No.: 745,918

[22] Filed: Jun. 18, 1985

[30] Foreign Application Priority Data

Nov. 13, 1984 [JP] Japan .................. 59-171969

[51] Int. Cl.$^4$ .................. G03B 21/06
[52] U.S. Cl. .................. 353/65; 353/63; 355/70; 362/12; 362/250; 362/285
[58] Field of Search .................. 353/63, 65, 66, 67; 362/11, 12, 227, 236, 238, 239, 249, 250; 355/67, 70; 362/65, 285, 287, 371, 418, 427, 450, 812

[56] References Cited

U.S. PATENT DOCUMENTS

| | | | |
|---|---|---|---|
| 1,090,984 | 3/1914 | Hawthorne | 362/427 |
| 1,781,372 | 11/1930 | Denecke | 362/427 |
| 3,375,752 | 4/1968 | Fairbanks et al. | 355/70 |
| 3,592,543 | 7/1971 | Bickl et al. | 355/70 |
| 3,632,204 | 1/1972 | Friedel | 355/70 |
| 4,164,009 | 8/1979 | Maguire, Jr. et al. | 362/371 |

FOREIGN PATENT DOCUMENTS 110553  7/1982  Japan .

Primary Examiner—Charles Frankfort
Assistant Examiner—Patrick R. Scanlon
Attorney, Agent, or Firm—Brumbaugh, Graves, Donohue & Raymond

[57] ABSTRACT

The invention relates to a device for reproduction and tracing by forming an image of an original, at desired scale which is produced by at least one lens, on a screen on which a sheet of photosensitive materials, such as a picture film, or tracing paper is extended, comprising separate illumination systems for reproduction and tracing, wherein the illumination system for tracing is retracted in a retraced position located off the lighting space of the illumination system for reproduction, and turned over so as to eliminate spoilage of the quality of the reproduced picture by diminishing irregular reflection from the illumination system for tracing to the lens when a part of light from the illumination system for reproduction is emitted thereto during the reproduction operation.

8 Claims, 4 Drawing Figures

DEVICE FOR REPRODUCTION AND TRACING

BACKGROUND OF THE INVENTION

1. Field of the Invention

The present invention relates to a device for reproduction and tracing by forming a projected image of an original, at desired scale which is produced by at least one lens, on a screen on which a sheet of photosensitive materials, such as a picture film is placed to take photograph of the image, or tracing paper to manually trace it thereon, comprising a table for holding an original in the place, separate illumination systems for reproduction and tracing, at least one lens for producing the desired scale of projection, and a screen for forming the image of the original. The invention, particularly relates, to a device of this kind in which said illumination system for tracing is retracted from the lighting range of said illumination system for reproduction during reproduction, and extended into said lighting range to illuminate said original placed on said table for tracing.

2. Prior Art

A device for reproduction and tracing of such kind is disclosed in Japanese Utility Model Opening Issue No. 57-110553 (ref. FIG. 4). This known device has a pair of illumination systems 102 for photographic reproduction of an original placed on the table 103. These illumination system 102 are comprised of very bright lamps such as halogen lamps. However, the radiation of heat from such lamp is so intense that is is unsuitable for tracing which requires illumination for a long period. Therefore, this known devise also comprises another pair of illumination systems for tracing using lamps 105, such as luminescence lamps which radiate little heat.

The illumination systems 101 for tracing of this known device, as shown in FIG. 4, are mounted on a pair of arms which support the illumination systems 102 for photographic reproduction, and which can be tilted to the position Oa, which is shown by phantom lines, during tracing operation, and retracted to the position Fa for the photographic operation so as to prevent interference of the illumination systems 102 from disturbance by the illumination system 101 during the photographic operation.

However, the luminous faces 104 of the lamps 105 of the illumination system 101 for tracing are directed upward when they are retracted to the position Oa, so that a part of light from illumination system 102 for photographic reproduction is emitted towards the cylindrical glass surfaces of these lamps 105, i.e., the luminous faces 104, reflected irregularly from there, and enter into the lens as flaring light, spoiling the quality of the photographic image. Moreover, the luminous faces 104 are easily soiled, and damaged by other substances dropped thereon in the dark room carelessly.

OBJECTS AND SUMMARY OF THE INVENTION

Therefore, the first object of the invention is to eliminate spoilage of quality of photographic reproduction by elimination of the production of flares even when a part of light from the illumination systems for photographic reproduction is directed towards the illumination systems for tracing in the course of the reproduction.

The second object of the invention is to decrease the frequency of cleaning of the luminous faces of the illumination systems for tracing by preventing it from soil.

The third object of the invention is to eliminate the damage of the luminous face of the illumination system for tracing by direct collision with substances dropped carelessly in the course of dark room operation.

To attain these objects a device for reproduction and tracing, according to the invention, comprises a table for placing an original in place, a screen apart from said table, at least one lens disposed between said table and said screen so as to form an image of said original on said screen, at least one illumination system for reproduction, so as to illuminate said original on said table in reproduction operation, at least one illumination system for tracing disposed between said table and said illumination system for reproduction, and movable between a retracted position out of the lighting space of said illumination system for reproduction extending therefrom to said table, and on extended position in said lighting space to illuminate said original on said table, wherein the improvement comprises said illumination system for tracing having a lamp shade and a luminous side at the front side of said lamp shade, said luminous side being turned down and directed to counter side of said lamp shade to said lighting space when said illumination system for tracing is located at said reproduction position.

In tracing operation, said illumination system for tracing is raised to said extended position to illuminate said original in place, and the projected image of said original, formed at said projection screen, is traced on a sheet of tracing paper put thereon.

And, in reproduction operation, said illumination system for tracing is retracted to said retracted position. And, said illumination system for reproduction is activated to illuminate said original without the disturbance of said illumination system for tracing. Any part of the light emitted towards said illumination system for tracing will be reflected at the back surface of said lamp shade regularly, so that flares in the projected image are substantially eliminated.

Said lamp shade is advantageously colored in dark color, in the order to eliminate flares in projected image more completely by diminishing the reflection of light therefrom.

Said luminous side of said illumination system for tracing is turned down and guarded from soil and other substances dropred thereon by said lamp shade when said system is retracted to said retracted position, so that said luminous side is less soiled and the interval of cleaning may become longer, and may be free from the damage by the direct collision with other substances dropped thereon in the course of dark room operation.

In the invention, said table, screen, and lens may be advantageously supported by a frame, and said illumination system for reproduction may be installed to said frame by an arm for installation, which is located under said lighting space. Moreover, said illumination system for tracing may be installed on said arm.

The fourth object of the invention is to make illmination systems for tracing movable easily manually between the retracted and extruded positions.

To attain this object, said illumination system for tracing, accoding to the invention, advantageously comprises a supporting member pivoted to the free end of said arm at one end so as to swing up and down freely, and to said lamp shade at the other end so as to make said lamp shade able to rotate about said other end of said member, and to turn down.

Said lamp shade is preferably provided with a handle for moving it at the part thereof above the part where said supporting member is pivoted.

Moreover, said illumination system for tracing advantageously comprises means for positioning in order to set it in said tracing position. Said means for positioning may comprise at least one, preferably a pair of positioning bars apart from one another and extending from the lower end of said lamp shade located in said tracing position, so as to make said lamp shade pass over said arm for installation, and a positioning plate having at least one positioning hole, preferably, a plurality of positioning holes aligned along the length of said arm for installation, and preferably, a plurality pairs of positioning holes aligned along the length of said arm in two lines at each side thereof, formed therethrough, in which said positioning bar is inserted for positioning. When said positioning plate is provided with a plurality of positioning holes aligned in a line along the length of said arm or a plurality pairs of positioning holes aligned in a pair of lines along the length of said arm, it is possible to select the lighting angle of said illumination system for tracing against said table in said tracing position by choosing one or a pair of said positioning holes in which said positioning bar is inserted for positioning of said lamp shade. More advantageously, said means for positioning may comprise a roller for seating said lamp shade on said arm and, at the same time, for guiding its motion between said reproduction and tracing positions by rolling over said arm freely. Said roller is advantageously supported to be rotatable by a pair of supporting bars at their middle height so as to stride and roll over said arm when said lamp shade is moved.

The fifth object of the invention is to make the illumination systems for tracing removable so that the apparatus can be used only for photographic reproduction, when tracing operation is not being practiced.

To attain this object, said lamp is hooked to be removable on the free end of said arm by a supporting member, while lamp shade is mounted on the part of said arm near the fixed end thereof by said roller.

BRIEF DESCRIPTION OF THE DRAWINGS

The invention will be clarified and understood more clearly by reading the detailed description of the preferred embodiment described below referring to the annexed drawings.

In the drawings.

DETAILED DESCRIPTION OF THE PREFERRED EMBODIMENT

Figure 3:
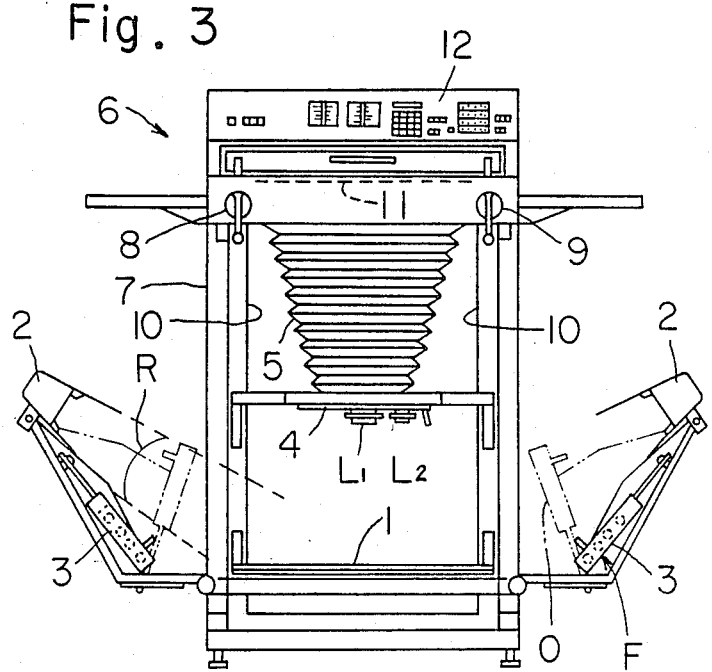
FIG. 3 is a front elevation of the device for reproduction and tracing accoding to the invention.
Figure 4:
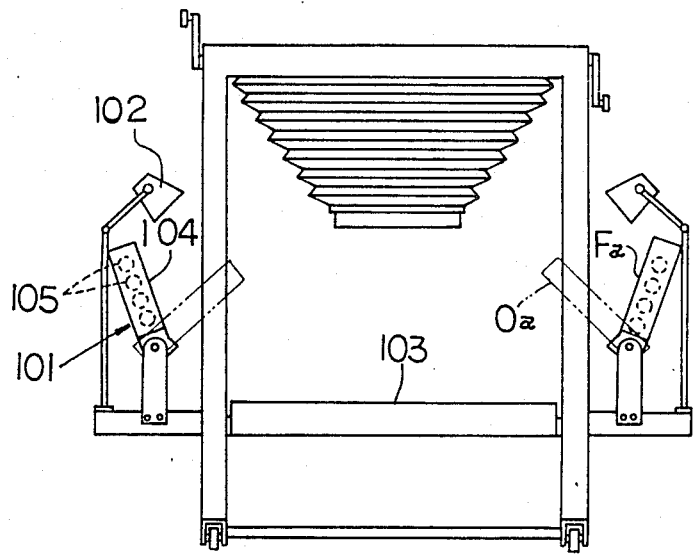
FIG. 4 is a front elevation of the known device for reproduction and tracing.

Now, referring to FIG. 3, a device for reproduction and tracing, according to the invention, comprises a table 1 for placing an original, which may be formed in sheet or solid, a pair of illumination systems 2 for photographic reproduction, a pair of illumination systems 3 for tracing, a lens holder 4 for holding a plurality of exchangeable lenses $L_1$, $L_2$, an expansible and contractible bellows 5 for supporting the lens holder and an upper support 6.

The table 1 is adapted to be moved up and down by operating a handle 8 for driving the table along the rails 10 fixed to the frame 7, and the lens holder 4 by operating a handle 9 for driving the lens holder as well, so as to form an image of desired scale projected from the original to the screen 11 disposed in the upper support 6.

The screen 11 is usually made of transparent glass, and for the reproduction operation, firstly a sheet of photosensive materials, such as picture film (not shown), and then a sheet of photoisolating mat (also not shown) are laid thereon in order, before the illumination systems 2 for photographic reproduction will be activated for a predetermined period.

Figure 2:
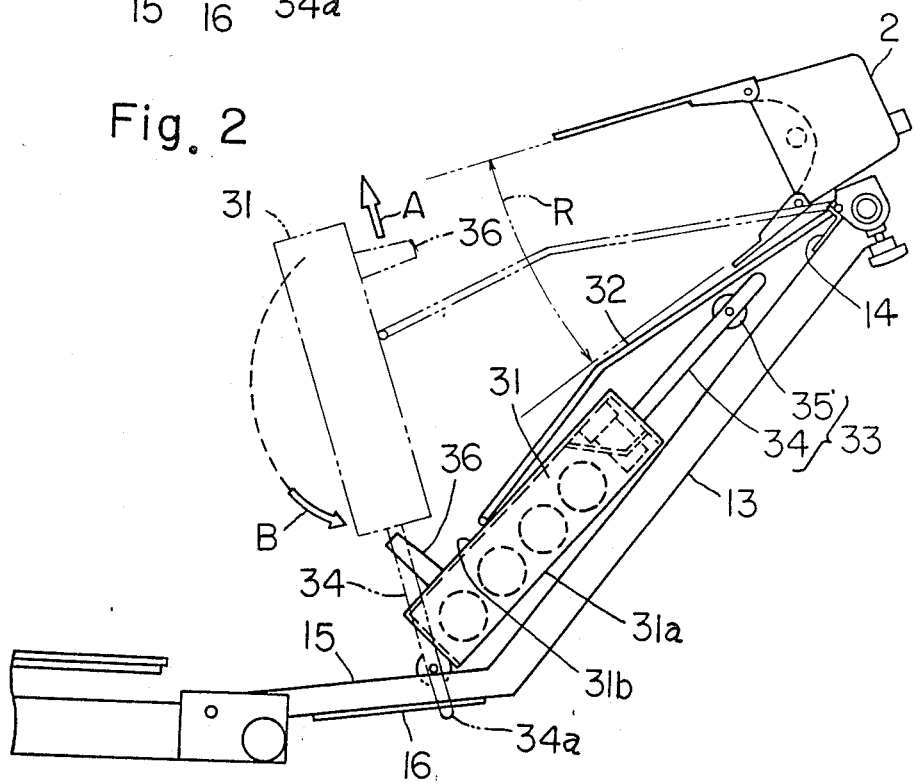
FIG. 2 is a front elevation of the illumination systems for reproduction and tracing shown in FIG. 1.

In the tracing operation, the illumination systems 3 for tracing are raised to the tracing position O, presented by phantom lines in FIGS. 2 and 3, for illuminating an original on the table 1 and activated to project the scaled image of the original to the screen 11 for tracing on tracing paper placed thereon.

A set of necessary switches and indicating meters are arranged in an operation panel 12 on to the upper support 6.

The features of the invention will be described more specifically hereinafter by referring to FIGS. 1 and 2.

Each illumination system 3 for tracing according to the invention comprises a lamp shade 31 having a back surface 31a, a supporting member 32 pivoted to the back surface 31a at one end and hooked to the free end of an arm 13 rotatably and removably at the other end thereof by a hooking element 14. The arm 13 is located under the lighting space R of the illumination system 2, which is extending from the table 1 (ref. FIG. 1).

Figure 1:
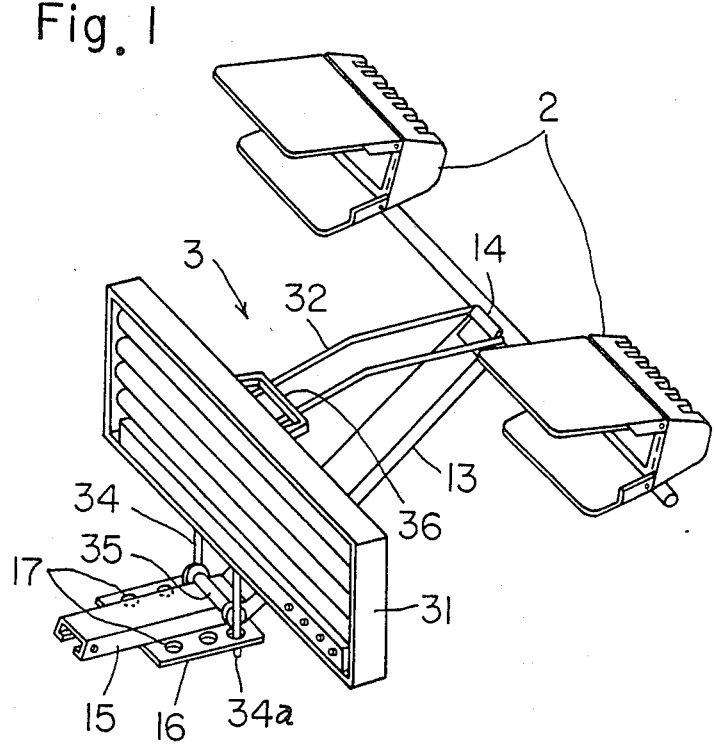
FIG. 1 is a perspective view of illumination systems for reproduction and tracing according to the present invention.

As seen in FIG. 1, each tracing illumination system 3 comprises a means for positioning it in a selected tracing position.

The means for positioning of the lamp shade 31 preferably comprises a pair of positioning bars 34, a positioning plate 16 having three pairs of positioning holes 17 aligned in a pair of lines along the arm 13 at each side thereof, and a roller 35 serving as a seating member of the lamp shade 31 and as a guide for the motion of the lamp shade 31 between said retracted and extended positions.

The positioning bars 34 are separate from one another and extend down from the bottom part of the lamp shade 31 in said extruded position, so as to pass over the part 15 of the arm 13 near the fixed lower end thereof. And the guide roller 35 is supported horizontally between these positioning bars 34 an intermediate position of their height. On the other hand, the receiving plate 16 is fixed under the part 15 of the arm 13. The lamp shade 31 is positioned in one of the three extruded positiones and adapted to take a desired lighting angle with respect to the original on the table 1 by inserting the lower ends 34a of the positioning bars 34 in a selected pair of positioning holes 17 formed through the positioning plate 16. The lamp shade 31 is provided with a handle 36, preferably at a part thereof above the position where the supporting member 32 is pivoted.

The motion of the illumination system 3 for tracing from the extended position O, shown by the phantom lines, to the reproduction position F, shown by full lines in FIG. 2 or 3, is in such a manner as described below.

Firstly, the handle 36 is taken up to pull the lamp shade 31 up in the direction shown by an arrow A, and the lower ends 34a of the positioning bars 34 are drawn out of the positioning holes 17, then the handle 36 is slowly rotated down in the direction shown by an arrow B. At the same time, the guide roller 35 is rolled over the upper surface of the arm 13 and elevated along it untill the lamp shade 31 is retracted and turned down along the arm 13 to the reproduction position where luminous side 31a of the lamp shade is turned downwards and of the back surface 31b is exposed to the lighting space R for reproduction.

The back surface 31b is colored black to eliminate flare in the projected image more completely by diminishing reflection of light therefrom.

It is obvious that the invention is not limitted to the embodiment described herein, and many modifications and amendments may be made by those skilled in the art within the course and the spirit of the invention implied in the following claims.

For example, the supporting member 32 may be pivoted to the free end of the arm 13 unremovable, or the means for positioning may comprise any other construction which is able to set the lamp shade 31 in a tracing position O and support it in the position, instead of the positioning bars 34, a positioning plate 16 and a guide roller 35.

I claim:

1. In a device for reproduction and tracing of an original comprising
   (a) a table upon which the original is placed;
   (b) a screen apart from said table;
   (c) at least one lens disposed between said table and said screen such that an image of an original placed upon the table can be formed on the screen at a desired scale;
   (d) a frame supporting said table, screen and lens;
   (e) at least one arm affixed to said frame at one end, and being free at the other end;
   (f) at least one illumination system for reproduction supported by said arm and positioned so as to illuminate the original placed upon the table; and
   (g) at least one illumination system for tracing supported by said arm and disposed between said illumination system for reproduction and said table, said illumination system for tracing being movable between an extended position wherein the illumination system for tracing extends into a space between the original placed on the table and said illumination system for reproduction, and a retracted position wherein the illumination system for tracing is outside said space between the original and said illumination system for reproduction, the improvement comprising forming said illumination system for tracing from a lamp means having a luminous front surface and an absorptive back surface, a supporting member, and a positioning means, wherein a first end of said supporting member is pivotally connected to the free end of said arm, and wherein said lamp means is pivotally connected to a second end of said supporting member such that in the retracted position said lamp means is rotatable such that the front surface faces the arm whereby illumination from the illumination system for reproduction can strike only the back surface, and such that in the extended position the front surface is oriented so as to illuminate the original on the table and is fixed in that orientation by the positioning means.

2. A device as recited in claim 1, wherein said positioning means comprises at least one positioning bar extending from the bottom end of said lamp means in said extended position, and a positioning plate, fixed to said arm, and having at least one positioning hole into which said positioning bar is inserted to fix the orientation of said lamp means in said extended position.

3. A device as recited in claim 2, wherein said means for positioning comprises a plurality of positioning holes in the positioning plate aligned along the length of said arm, so as to make the orientation of the lamp means in said extended position selectable by choosing one of said positioning holes for said positioning bar.

4. A device as recited in claim 1, wherein said lamp means is provided with a roller for seating it on said arm and guiding said lamp means along said arm in its motion between said retracted and extruded positions by rolling freely thereof over said arm.

5. A device as recited in claim 2, wherein said means for positioning comprises a pair of positioning bars extending from said lamp means and being separate from one another so as to make said lamp means pass over said arm by these bars, a roller supported by the middle of said positioning bars, said roller being adapted to roll freely over said arm when said lamp means is moved between the retracted and extended positions.

6. A device recited in claim 1, wherein said lamp means is provided with a handle.

7. A device as recited in claim 1, wherein the illumination system for tracing is removable.

8. A device as recited in claim 1, wherein the back surface of said lamp means is colored a dark color.

* * * * *